United States Patent
Lewis

(10) Patent No.: US 9,660,807 B2
(45) Date of Patent: May 23, 2017

(54) SYSTEM AND METHOD FOR VERIFYING CHANGES TO UEFI AUTHENTICATED VARIABLES

(71) Applicant: Insyde Software Corp., Taipei (TW)

(72) Inventor: Timothy Andrew Lewis, El Dorado Hills, CA (US)

(73) Assignee: INSYDE SOFTWARE CORP., Taipei (TW)

( * ) Notice: Subject to any disclaimer, the term of this patent is extended or adjusted under 35 U.S.C. 154(b) by 0 days.

(21) Appl. No.: 14/492,916

(22) Filed: Sep. 22, 2014

(65) Prior Publication Data

US 2015/0089238 A1    Mar. 26, 2015

Related U.S. Application Data

(60) Provisional application No. 61/880,222, filed on Sep. 20, 2013.

(51) Int. Cl.

| | |
|---|---|
| *H04L 29/06* | (2006.01) |
| *H04L 9/08* | (2006.01) |
| *G06F 21/44* | (2013.01) |
| *G06F 21/57* | (2013.01) |
| *H04L 9/32* | (2006.01) |

(52) U.S. Cl.
CPC ............ *H04L 9/0891* (2013.01); *G06F 21/44* (2013.01); *G06F 21/572* (2013.01); *H04L 9/3226* (2013.01); *H04L 9/3236* (2013.01); *H04L 9/3297* (2013.01)

(58) Field of Classification Search
CPC ... H04L 9/3242; H04L 63/0457; G06F 21/44; G06F 21/575; G06F 21/572

USPC .......................................................... 713/183
See application file for complete search history.

(56) References Cited

U.S. PATENT DOCUMENTS

| | | | |
|---|---|---|---|
| 2003/0091218 A1* | 5/2003 | Hamid ............... | G06K 9/00067 382/124 |
| 2010/0257597 A1* | 10/2010 | Miyazaki ............ | H04L 63/0815 726/8 |
| 2012/0266259 A1 | 10/2012 | Lewis | |

OTHER PUBLICATIONS

UEFI Specification 2.3.1, Apr. 6, 2011.*
UEFI Specification (p. 1788) Apr. 6, 2011.*

* cited by examiner

*Primary Examiner* — Syed Zaidi
(74) *Attorney, Agent, or Firm* — McCarter & English, LLP; John S. Curran

(57) ABSTRACT

A mechanism for certifying that an operating system-based application has authorization to change a UEFI authenticated variable held in the system firmware is discussed. Embodiments of the present invention receive with the system firmware a request from an operating system-based application to change a UEFI authenticated variable. The request includes an authentication descriptor header with a timestamp and pre-determined GUID. The request also includes a hash calculated using a password known to the firmware. The system firmware certifies that the caller has authorization to change an authenticated variable by first verifying the information in the header and then creating a new hash using the password. The new hash is compared to the received hash and must match in order for the system firmware to allow the alteration of the UEFI authenticated variable. In one embodiment, the password is the system firmware password.

18 Claims, 4 Drawing Sheets

SYSTEM AND METHOD FOR VERIFYING CHANGES TO UEFI AUTHENTICATED VARIABLES

RELATED APPLICATION

This application is related to, and claims the benefit of, U.S. Provisional Patent Application No. 61/880,222, entitled "System and Method for Verifying Changes to UEFI-Authenticated Variables", filed Sep. 20, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). UEFI specifications describe a set of tools by which a computing device can move in an organized fashion from the power-applied state to fully operational. The UEFI specification tells the desired result but deliberately does not specify the internal tactic of implementation. The UEFI firmware specification replaces earlier operating system (OS)/firmware interfaces previously used by the industry and commonly known as legacy BIOS (Basic Input Output System).

The UEFI specification provides a facility called driver signature checking by which software from other parties can be 'signed' using public/private key cryptographic techniques at its origin and this signature is validated by the platform firmware prior to allowing this software to operate. The signature checking concentrates on software added to configure optional components (such as plug-in boards) and software supplied by the Operating System for early boot steps (such as OS boot loaders.) The signature checking is accomplished with a library of approved keys. The platform must take care to not allow unauthorized software elements any ability to modify the library of approved keys as this would allow rogue software elements to defeat the signature checking.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the ROM. A ROM for a computing device is partitioned into several functional divisions or regions. One such region is called the Authenticated Variable Region or Store that stores Authenticated Variables defined in the UEFI specification. The Authenticated Variable Store is used to hold UEFI-defined security information (the system security database) used to perform signature checking. Because it contains security data and potentially sensitive user data, the UEFI specification provides that the Authenticated Variable Region/Store must be protected from alteration by any entity except those authorized by the presence of identifying key data within the security database.

BRIEF SUMMARY

Embodiments of the present invention provide a mechanism for certifying that an operating system-based application (i.e.: an application being executed while the operating system is in control of the computing device's operation) has authorization to change a UEFI authenticated variable held in the system firmware. Embodiments of the present invention receive with the system firmware a request from an operating system-based application to change a UEFI authenticated variable. The request includes an authentication descriptor header with a timestamp and pre-determined GUID. The request also includes a hash calculated using a password known to the firmware. The system firmware certifies that the caller has authorization to change an authenticated variable by first verifying the information in the header and then creating a new hash using the password. The new hash is compared to the received hash and must match in order for the system firmware to allow the alteration of the UEFI authenticated variable. In one embodiment, the password is the system firmware password.

In one embodiment, a computing device-implemented method for trusting an operating system application attempting to change a UEFI authenticated variable includes the step of receiving with system firmware a request from an operating system application to alter a UEFI authenticated variable. The method further examines the request, the examining verifying that a portion of an authentication header is set to a pre-determined GUID and that the request contains a timestamp value that is later than a current timestamp value associated with the UEFI authenticated variable for which alteration is requested. Additionally, the method calculates with the firmware a new hash based on a password and compares the new hash to a hash contained in the request that was created using the same password. Alteration of the UEFI authenticated variable is allowed in event of a match between the new hash and the hash contained in the request.

In another embodiment, a computing device includes a processor, an operating system and an operating system-based application executed while the computing device is under control of the operating system. The computing device also includes system firmware stored in Read Only Memory. The system firmware is configured to receive a request from the operating system-based application to alter a UEFI authenticated variable and examine the request. The examining of the request verifies that a portion of an authentication header is set to a pre-determined GUID and that the request contains a timestamp value later than a current timestamp value associated with the UEFI authenticated variable for which alteration is requested. The system firmware is also configured to calculate a new hash based on a password, compare the new hash to a hash contained in the request that was created using the same password, and allow alteration of the UEFI authenticated variable in the event of a match between the new hash and the hash contained in the request.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Often it is desirable for an application being executed while the operating system is in control of the computing device's operation to communicate with the firmware in a computing device to change a firmware setting. Such an application is referred to hereafter as "operating system application". Since many firmware settings are sensitive in nature and able to compromise system security or stability, it is important that the firmware only changes the settings if the operating system application can be trusted. If an operating system application can be trusted, then the changes to the firmware setting made by the operating system application can also be trusted. In one approach to establishing trust between the firmware and the operating system application, this trust is implied by the application's special knowledge of the system firmware and the fact that relatively few people know about the interface or its arguments. This approach provides security through obscurity. Unfortunately however, once the interface and its details become known, there is no security.

In another approach to establish trust between the operating system application and the system firmware, the operating system application itself is signed by a private key and the operating system application is verified by the firmware using the corresponding public key. After the verifying, data passed from the operating system application to the system firmware is trusted. However, a person able to obtain the trusted application could potentially use the application to pass invalid or harmful configuration settings since it is the application itself which is trusted.

The UEFI specification defines another means of establishing trust by requiring that data related to a change in a UEFI variable be signed by a key that can be attested to by one of the certificates in the system firmware's key database. That is, the data, or hash of the data, or portion of the data, is signed by a private key for which the corresponding public key is located in the system firmware. This approach works well for producing configuration updates which are produced by an OS vendor or system manufacturer since the updated data can be signed by the private key in a secure environment where the private key cannot be easily stolen.

Figure 1:
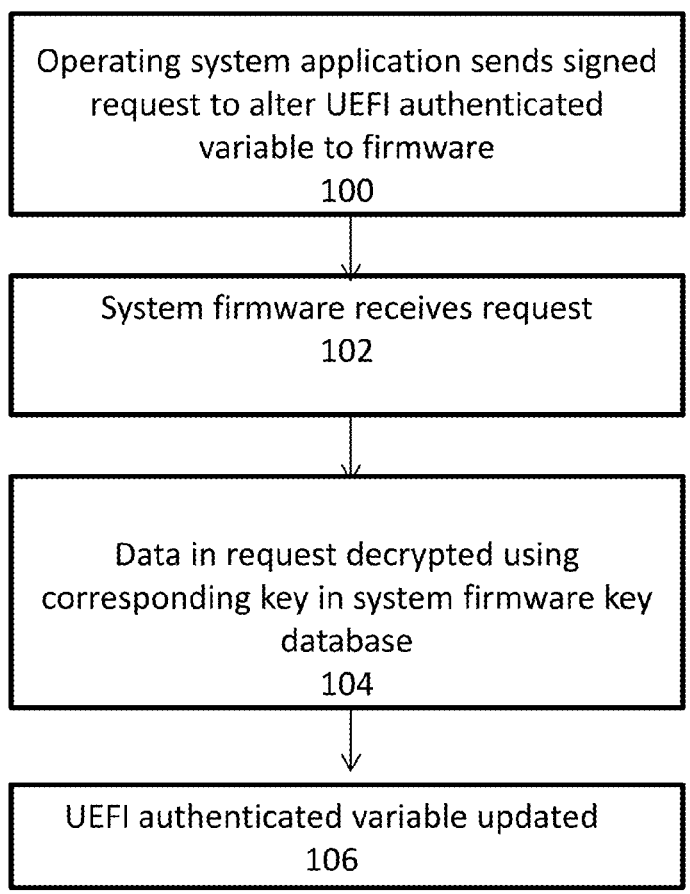
FIG. 1 (prior art) depicts a sequence of steps performed to conventionally verify that an operating system application is authorized to change a UEFI authenticated variable.

FIG. 1 (prior art) depicts such a conventional sequence of steps performed by the system firmware to verify that an operating system application is authorized to change a UEFI authenticated variable. The sequence begins with the operating system sending a signed request to alter a UEFI authenticated variable to the system firmware (step 100). In this request, the data is signed by a private key whose corresponding public key is stored in the system firmware. The request is received by the system firmware (step 102) and the data in the request is decrypted using the stored public key in the firmware's key database (step 104). Once the request is decrypted, the request is processed and the UEFI authenticated variable is altered as requested (step 106). Unfortunately, the approach indicated in the UEFI specification does not work well on data that is generated on the system, since the local system does not usually have access to a private key for which the firmware has the corresponding public key. If the local system were to have access to the private key, there would be the danger that the private key would be stolen thus compromising that system and all other systems which used the same public/private key pair.

Embodiments of the present invention provide an alternative mechanism to establish trust that does not require the operating system application to maintain or access any private keys. Instead security relies on a secret such as a password that is shared between the user and the system firmware. That secret password must be shared briefly with the application to generate the authentication information after which it is discarded by the application. This approach does require that the user trust the application not to store the secret but allows for data that is generated locally to be passed to the system firmware without requiring local system access to a private key, or access to a trusted $3^{rd}$ party with access to the key, in order to make modifications. Embodiments of the present invention thus take advantage of a user's knowledge of a secret, for example the system firmware password or other password, that is shared with the firmware in order to authorize updates to system firmware configuration settings stored in UEFI authenticated variables.

The UEFI specification defines the SetVariable( ) function as part of its runtime services (section 7.2). This function changes UEFI configuration settings stored in "variables" Each variable consists of a GUID, a name, a variable-length block of data and a few attributes describing when it can be accessed, where it should be stored and what type of security should be used. SetVarible is defined as:

```
Typedef
EFI_STATUS
SetVariable (
    IN CHAR16 *VariableName,
    IN EFI_GUID *VendorGuid,
    IN UINT32 Attributes,
    IN UINTN DataSize,
    IN VOID *Data
    );
```

If bit 5 of Attributes is set (indicated by the pre-defined constant identifier EFI_VARIABLE_TIME_BASED_AUTHENTICATED_WRITE_ACCESS), it indicates that the Data is prefixed by an authentication descriptor (EFI_VARIABLE_AUTHENTICATION_2) which describes the information needed by the firmware to decide whether to allow the variable to be updated. The UEFI specification defines the following header:

```
//
// EFI_VARIABLE_AUTHENTICATION_2 descriptor
//
// A time-based authentication method descriptor template //
typedef struct {
    EFI_TIME TimeStamp;
    WIN_CERTIFICATE_UEFI_GUID AuthInfo;
} EFI_VARIABLE_AUTHENTICATION_2;
```

The TimeStamp field indicates the time associated with the authentication descriptor. The Pad1, Nanosecond, TimeZone, Daylight and Pad2 fields of the TimeStamp field (see EFI_TIME) must be set to zero to allow for easy equality comparisons between two time stamps. The TimeStamp field is used to verify that saved copies of valid descriptors cannot be used to return a variable to a previous, possibly less-desirable, value. For example, the previous version of the variable might enable known security vulnerabilities which were patched in a subsequent version. If the time stamp were not checked, an attacker might try to "rollback" to a valid, but earlier and insecure, version. The AuthInfo field is a GUID that identifies the format of the authentication information. There is at least one type of GUID defined by the UEFI specification (EFI_CERT_TYPE_PKCS7_GUID) which identifies the data that follows the authentication header as a certificate as defined in the PKCS #7 standard and the Microsoft Authenticode standard. However, in one embodiment of the present invention, another GUID value that identifies the method described in this invention to the firmware is substituted into the AuthInfo field. For example, a GUID may be substituted into the AuthInfo field that is defined as:

```
H2O_CERT_TYPE_PASSWORD_GUID = { /* d045a829-aba6-4219-8f07-b12842ac0dbd */
    0xd045a829,
    0xaba6,
    0x4219,
    {0x8f, 0x07, 0xb1, 0x28, 0x42, 0xac, 0x0d, 0xbd}
};
```

Other GUID values may also be used by other embodiments of the present invention. In one embodiment, different GUID values may be used to distinguish between certain variations of authentication information, as described herein.

In an embodiment, following the authentication header, is a SHA-256 hash of a buffer containing the following data, byte padded:
1. The string pointed to by the VariableName parameter of SetVariable( ) excluding the terminating null character.
2. The GUID pointed to by the VendorGuid parameter of SetVariable( ).
3. The TimeStamp structure.
4. The DataSize bytes pointed to by Data. For the purpose of this invention, Data shall point to a Unicode string (without null-terminator) consisting of a password, such as a system firmware password.

It will be appreciated that other data, or other combinations of data, may be used with the password to create the has without departing from the scope of the present invention. Further, in one embodiment, only the password is hashed.

During the processing of the SetVariable( ) function call by the firmware, the following sequence of steps may be used by an embodiment of the present invention to verify that the calling operating system application is authorized to change the variable:
1. Verify that the AuthInfo portion of the authentication header is set to H2O_CERT_TYPE_PASSWORD_GUID. If not, then fail. The GUID tells the firmware that the password-based descriptor is being used to authenticate the request to change the variable contents.
2. Verify that the Pad1, Nanosecond, TimeZone, Daylight and Pad2 fields of the TimeStamp portion of the authentication header is set to 0. If not, fail. Since these fields are not a part of the actual time stamp used by this function, but are embedded in the middle of the structure, if they were non-zero, a simple binary comparisons of the two structures would yield a false negative result. Additionally, this method follows the procedure introduced in the UEFI specification and allows for some shared code.
3. Unless the EFI_VARIABLE_APPEND_WRITE attribute is set, verify that the TimeStamp value is later than the current timestamp value associated with the variable to make sure that the descriptor is not a previously saved descriptor being re-used. If not, fail.
4. Calculate a new hash by using the following as input to the SHA-256 algorithm:
   a. The string pointed to by the VariableName parameter of SetVariable( ) excluding the terminating null character.
   b. The GUID pointed to by the VendorGuid parameter of SetVariable( ).
   c. The TimeStamp structure.
   d. The DataSize bytes pointed to by Data. For the purpose of this invention, Data shall point to a Unicode string (without null-terminator) consisting of the actual system firmware password.
5. Compare the resulting new hash with the hash which immediately follows the authentication descriptor in the request. If they do not match, the calling application is not authorized to change the UEFI variable.

As noted above, other combinations of data in combination with the password may also be used by the operating system application and the firmware to create the hashes described herein.

In another embodiment, other hash algorithms may be used in place of the SHA-256 algorithm described herein.

Figure 2:
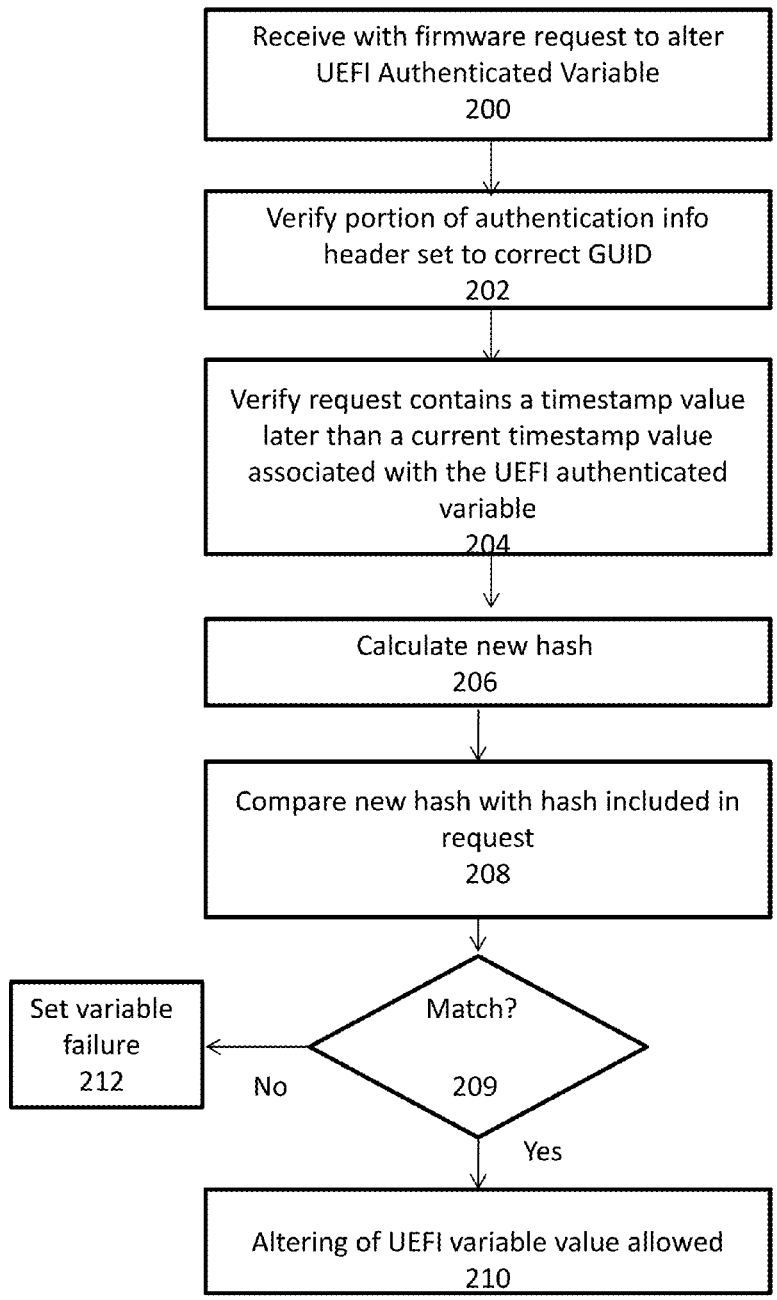
FIG. 2 depicts an exemplary sequence of steps performed by system firmware in an embodiment of the present invention to verify that an operating system-based application is authorized to change a UEFI authenticated variable.

FIG. 2 depicts an exemplary sequence of steps performed by system firmware in an embodiment of the present invention to verify that an operating system-based application is authorized to change a UEFI authenticated variable. The sequence begins with the firmware receiving a request to alter a UEFI authenticated variable (step 200). The firmware verifies that the authentication info is set to a pre-determined GUID (step 202). For example, in one embodiment, the system firmware may verify that the AuthInfo portion of the authentication header is set to H2O_CERT_TYPE_PASSWORD_GUID. The firmware also verifies that the request contains a timestamp value is later than a current timestamp value associated with the UEFI authenticated variable (step 204). For example, in one embodiment unless the EFI_VARIABLE_APPEND_WRITE attribute is set, the timestamp value is verified to make sure that it is a later time than the current timestamp value associated with the variable. A new hash is then calculated using a password known to the firmware, such as the system firmware password (step 206). For example, in one embodiment, the new hash is based on a string pointed to by the VariableName parameter of SetVariable( ) excluding the terminating null character, the GUID pointed to by the VendorGuid parameter of SetVariable( ) the TimeStamp structure and the system firmware password if that was the input data used by the operating system application in creating the original hash. In other embodiments, other combinations of data may be hashed with the password. The new hash is compared to the hash included in the request received from the operating system application (step 208). A determination is made as to whether the hashes match (step 209). If the hashes match (step 209), the UEFI authenticated variable may be changed as requested (step 210). If the hashes don't match, alteration of the variable is not allowed (step 212).

Figure 3:
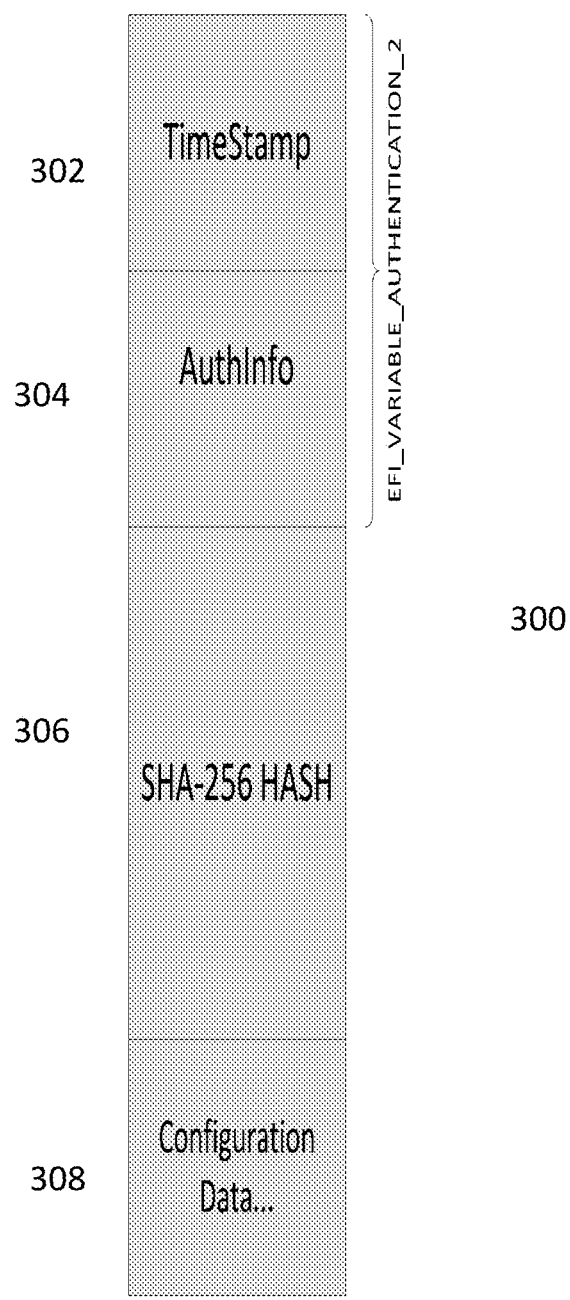
FIG. 3 depicts an exemplary depiction of a data structure used to request an alteration of a UEFI authenticated variable used by an embodiment of the present invention.

FIG. 3 depicts an exemplary depiction of a data structure used to request an alteration of a UEFI authenticated variable used by an embodiment of the present invention. The request data structure 300 includes an authentication header such as the EFI_VARIABLE_AUTHENTICATION_2 fields, including TimeStamp 302 and AuthInfo 304. The request structure further includes the SHA-256 (or other type of) hash 306 generated by the operating system application followed by the configuration data 308 that will be used to change the variable. This configuration data changes the behavior of the firmware either immediately or upon the next boot.

In one embodiment, in order to change a system firmware configuration setting using UEFI variables, the operating system application asks for the input of the system firmware password, creates the hash as described above, and then clears the system firmware password from memory so that the chances of it being snooped by another process or application is limited. The exact best practices for performing these steps are specific to each operating system. For example, some operating systems provide special modes where sensitive information can be entered and processed where all other processes are suspended. It is common for system firmware implementations to require at least one password to access sensitive settings in the pre-OS environment. In one embodiment, that same firmware password may also be used to prove an operating system application is trusted to change a UEFI authenticated variable as described herein. In another embodiment, more than one password is allowed to change a setting. Also, in another embodiment specific passwords are required for specific configuration settings stored in UEFI variables. For each setting, a new hash is created and compared to the received hash to see whether the hashes match that generated by the correct password.

Figure 4:
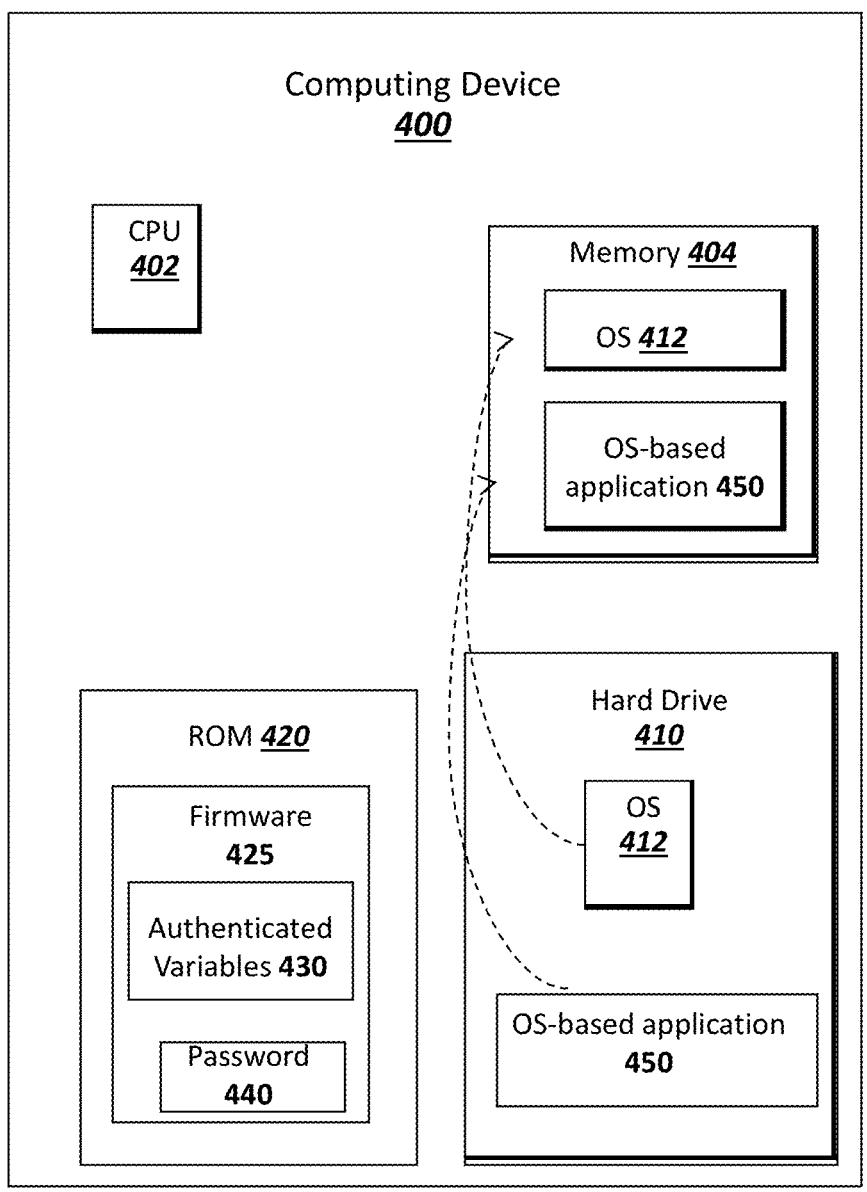
FIG. 4 depicts an exemplary environment suitable for practicing an embodiment of the present invention.

FIG. 4 depicts an exemplary environment suitable for practicing an embodiment of the present invention. A computing device 400 includes a CPU 402 used to process instructions. The computing device 400 may be a PC, laptop computer, tablet computing device, server, smartphone or some other type of computing device equipped with a processor and able to execute firmware that complies with the UEFI specification. The computing device 400 may also include a memory 404 such as Random Access Memory (RAM). An operating system 412 that is stored on a hard drive 410 or other non-volatile storage that is in, or in a location in communication with, computing device 400 may be loaded into memory 404 as part of a boot process performed by the computing device.

The computing device 400 may also include ROM 420. ROM 420 may be flash ROM and may include firmware 425 as described above that is operable at different points of the computing device's operation. The ROM 420 may also hold UEFI authenticated variables. Firmware 425 may also include, or have access to, password 440 stored in a non-volatile protected location such as ROM 420 that is used to validate requests from an OS-based application 450 to alter a UEFI authenticated variable as described herein.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computing device-implemented method for trusting an operating system application attempting to change a Unified Extensible Firmware Interface (UEFI) authenticated variable comprising:
   receiving, with an operating system application, a user-supplied password;
   using the user-supplied password to create a hash of configuration data for a request to alter a UEFI authenticated variable;
   clearing, the user-supplied password from a memory of the computing device following the creating of the hash of configuration data for the request;
   receiving with system firmware the request to alter the UEFI authenticated variable from the operating system application, the request accompanied by the hash of configuration data and the configuration data;
   examining the request with the system firmware, the examining verifying that a portion of an authentication header is set to a pre-determined Globally Unique Identifier (GUID) and that the request contains a timestamp value later than a current timestamp value associated with the UEFI authenticated variable for which alteration is requested, the pre-determined GUID indicating that the operating system application request used a password-based mechanism for authentication;

calculating with the firmware a new hash of the configuration data contained in the request based on a password known to the firmware;

comparing the new hash to the hash contained in the request; and allowing alteration of the UEFI authenticated variable in event of a match between the new hash and the hash contained in the request.

2. The method of claim 1 wherein the user-supplied password and the password know to the firmware is a system firmware password.

3. The method of claim 1 wherein the calculating of the new hash is also based on a name of the UEFI authenticated variable.

4. The method of claim 1 wherein the calculating of the new hash is also based on the GUID pointed to by a VendorGuid parameter of SetVariable( ).

5. The method of claim 1 wherein the calculating of the new hash is also based on a structure of the time stamp.

6. The method of claim 1 wherein the password used to generate the new hash is selected by the firmware based on a UEFI authenticated variable name contained in the request.

7. The method of claim 1 wherein a plurality of new hashes are created based on a plurality of passwords and compared to the hash contained in the request.

8. A non-transitory medium holding computer-executable instructions for trusting an operating system application attempting to change a Unified Extensible Firmware Interface (UEFI) authenticated variable, the instructions when executed causing at least one computing device to:

receive, with an operating system application, a user-supplied password;

use the user-supplied password to create a hash of configuration data for a request to alter a UEFI authenticated variable;

clear, the user-supplied password from a memory of the at least one computing device following the creating of the hash of configuration data for the request;

receive with system firmware the request to alter the UEFI authenticated variable from the operating system application, the request accompanied by the hash of configuration data and the configuration data;

examine the request with the system firmware, the examining varifying that a portion of an authentication header is set to a pre-determined Globally Unique Identifier (GUID) and the request contains a timestamp value later than a current timestamp value associated with the UEFI authenticated variable for which alteration is requested, the pre-determined GUID indicating that the operating system application request used a password-based mechanism for authentication;

calculate with the firmware a new hash of the configuration data contained in the request based on a password known to the firmware;

compare the new hash to the hash contained in the request; and allow alteration of the UEFI authenticated variable in event of a match between the new hash and the hash contained in the request.

9. The medium of claim 8 wherein the user-supplied password and the password known to the firmware is a system firmware password.

10. The medium of claim 8 wherein the calculating of the new hash is also based on a name of the UEFI authenticated variable.

11. The medium of claim 8 wherein the calculating of the new hash is also based on the GUID pointed to by a vendorGuid parameter of SetVariable( ).

12. The medium of claim 8 wherein the calculating of the new hash is also based on a structure of the time stamp.

13. The medium of claim 8 wherein the password used to generate the new hash is selected by the firmware based on a UEFI authenticated variable name contained in the request.

14. The medium of claim 8 wherein a plurality of new hashes are created based on a plurality of passwords and compared to the hash contained in the request.

15. A computing device, comprising:

a processor;

an operating system;

an operating system-based application executed while the computing device is under control of the operating system, the operating system application configured to:
receive a user-supplied password;
use the user-supplied password to create a hash of configuration data for a request to alter a UEFI authenticated variable;
clear, the user-supplied password from a memory of the at least one computing device following the creating of the hash of configuration data for the request;

system firmware held in Read Only Memory, the system firmware configured to:
receive the request to alter the UEFI authentication variable from the operating system-based application, the request accompanied by the hash of configuration data and the configuration data;
examine the request, the examining verifying that a portion of an authentication header is set to a pre-determined Globally Unique Identifier (GUID) and the request contains a timestamp value later than a current timestamp value associated with the UEFI authenticated variable for which alteration is requested, the pre-determined GUID indicating that the operating system application request used a password-based mechanism for authentication;
calculate a new hash of the configuration data contained in the request based on a password known to the system firmware;
compare the new hash to the hash contained in the request; and
allow alteration of the UEFI authenticated variable in event of a match between the new hash and the hash contained in the request.

16. The computing device of claim 15 wherein the user-supplied password and the password know to the system firmware is a system firmware password.

17. The computing device of claim 15 wherein the password used to generate the new hash is selected by the firmware based on a UEFI authenticated variable name contained in the request.

18. The computing device of claim 15 wherein a plurality of passwords are stored in the ROM and a plurality of new hashes are created based on the plurality of passwords and compared to the hash contained in the request.

* * * * *